Figure 1:
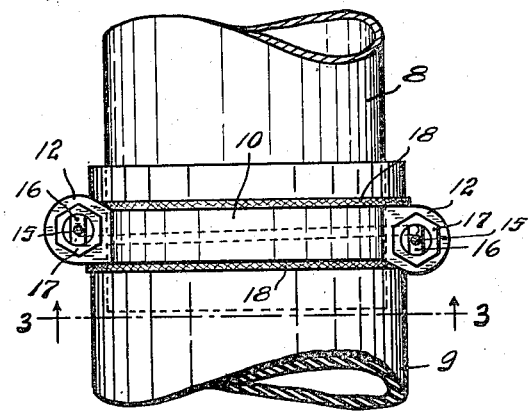

P. H. WILKINSON.
HOSE CLAMP.
APPLICATION FILED OCT. 10, 1921.

1,413,818.

Patented Apr. 25, 1922.

Inventor
Paul H. Wilkinson
By his Attorney
Fred C. Matheny

UNITED STATES PATENT OFFICE.

PAUL H. WILKINSON, OF SEATTLE, WASHINGTON.

HOSE CLAMP.

1,413,818.                    Specification of Letters Patent.    Patented Apr. 25, 1922.

Application filed October 10, 1921. Serial No. 506,542.

*To all whom it may concern:*

Be it known that I, PAUL H. WILKINSON, a citizen of the United States, residing at Seattle, in the county of King and State of Washington, have invented certain new and useful Improvements in Hose Clamps, of which the following is a specification.

My invention relates to improvements in hose clips or clamps of the type wherein a transverse yoke and a flexible cable are used for tightly securing a hose or flexible tube onto a pipe or nonflexible tube and the object of my improvement is to provide a clamp of this nature which is constructed and arranged so that when the cable is applied and drawn tight a substantially uniform pressure will be exerted around the entire circumference of the hose and the pipe over which it fits to thereby form a joint that will not leak even when subjected to comparatively high pressures.

I am familiar with certain prior devices of this nature that utilize a transverse yoke and a flexible cable that is wound substantially one and one half turns around the joined parts but in the devices with which I am familiar that portion of the yoke that rests on the hose is of channel shaped cross section to permit the flexible cable to pass freely thereunder and the yoke does not rest upon or press upon the cable in any way when the cable is tightened. I have found that with a device of this nature it is impossible to make a tight joint and one that will not leak because even when the flexible cable is secured to and tightened from both ends of the yoke friction will prevent that portion of the cable that passes under the yoke from drawing tight enough to form a joint that will not leak under ordinary pressures. I overcome this difficulty by providing a yoke having a flat concave saddle portion that rests on the hose and having in said flat concave saddle portion a groove extending from end to end thereof which is of less depth than the diameter of the cable and which is adapted to receive the cable so that when the yoke is drawn against the hose that portion of the cable in the groove of the yoke will be pressed firmly and tightly into the hose thereby securely binding the hose to the pipe and forming a joint that will stand a substantially uniform pressure around its entire circumference without leaking.

Another improvement included in this invention resides in the provision, on the ends of the cable, of threaded end pieces that are flattened on one or more sides and in the provision within the ends of the yoke of holes that are flattened to fit the end pieces and to prevent the end pieces from turning when nuts are screwed onto the same.

A further improved feature of the invention resides in offsetting the holes in the ends of the yoke to opposite sides of the center line of such yoke sufficiently to compensate for the winding of the cable around the hose and pipe and to thereby permit a straight pull on the cable when the same is tightened up.

Other objects are to provide a hose clamp of this nature that is strong and simple in construction, not expensive to manufacture, easy to apply to tubular conduits of almost any shape and construction, that will not cut or damage a hose or flexible tube and that will form a joint that is uniformly tight around its entire circumference and will not leak when subjected to heavy pressures.

Figure 4:
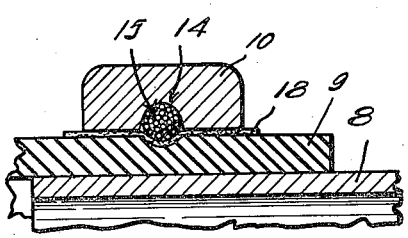
Figure 3:
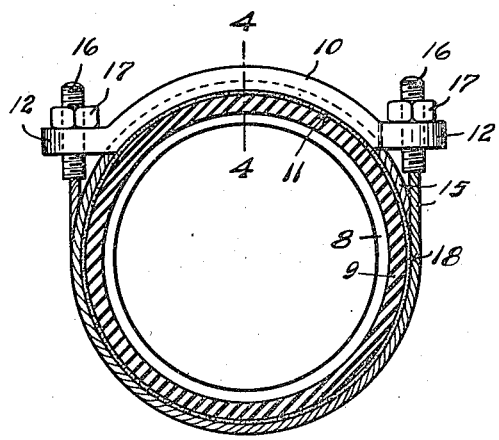
Figure 2:
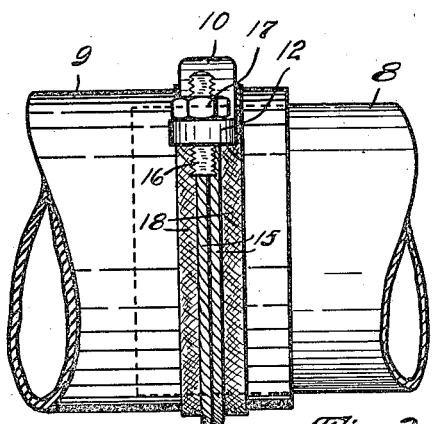
Figure 7:
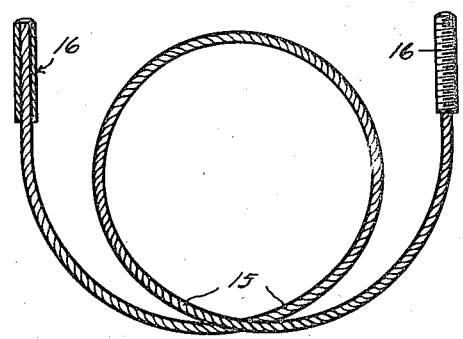
Figure 5:
Figure 6:
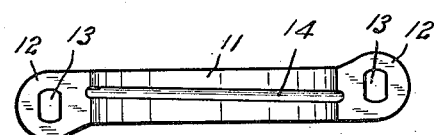

I accomplish the above objects by devices illustrated in the accompanying drawings in which Figure 1 is a plan view showing my hose clamp as it may appear when used for clamping a hose onto the end of a pipe: Fig. 2 is a view in side elevation of the same; Fig. 3 is a view in cross section on broken line 3, 3 of Fig. 1 showing the hose clamp in elevation: Fig. 4 is an enlarged fragmentary view in cross section on broken line 4, 4 of Fig. 3: Fig. 5 is a detached view in elevation of the yoke member: Fig. 6 is a plan view of the under side of the yoke members and Fig. 7 is a detached view in elevation of the cable.

Like reference numerals designate like parts throughout the several views.

Referring to the drawings: The numeral 8 designates a non-flexible tube or pipe and 9 designates a flexible tube or hose that telescopes over the end of the pipe 7 and is tightly secured thereto by hose clamp means constructed in accordance with this invention.

The hose clamp comprises a yoke or saddle 10 of relatively narrow width, having a concave inner surface 11 of the same curvature as the hose and having outwardly directed ends 12 that are each provided with a perforation 13 that is preferably flattened on one or more sides, the perforation in one end 12 being offset to one side of the center line of the yoke 10 and the perforation in the other end 12 being offset to the other side of the center line of the yoke to compensate for the wrapping of the cable around the hose as hereinafter explained.

The concave inner surface 11 of the yoke 10 is provided with a shallow groove 14 that extends from one end to the other thereof at a slight angle with respect to the longitudinal axis of the yoke as more clearly shown in Fig. 6.

Co-operating with the yoke 10 is a flexible cable 15 that is long enough to wrap about one and one half turns around the hose and that is provided with two threaded end pieces or terminals 16, one on each end, that are flattened on one or more sides, so that they will fit within and may be projected through the perforations 13 and that are arranged to have nuts 17 screwed thereon by which the flexible cable or binder 15 may be tightened about the hose 9. If desired, thumb nuts may be used instead of the nuts 17.

The threaded end pieces 16 may be secured to the cable 15 by making the end pieces hollow or tubular, inserting the ends of the cable therein and then welding or soldering the ends of the cable to the threaded end pieces.

In applying this clamp the end of the hose is slipped over the end of the pipe to which it is to be secured and the cable 15 and yoke 10 are then applied to the hose with the central portion of the cable disposed within the groove 14 in the yoke and the end pieces 16 projecting through the slots or perforations 13. The nuts 17 are then put on and tightened to draw the cable tightly around the hose 9 and to draw the yoke firmly into contact with the hose thereby making a joint or connection that will not leak.

In applying this clamp a strip of fabric 18 is preferably inserted between the cable 15 and the hose 9 to prevent injury to the hose.

The cable is necessarily wound substantially one and one half turns around the hose and I have found that on account of friction that portion of the cable that is furthest from the ends and that passes under the yoke 10 will not draw down tightly if it is free of the yoke and will leave a comparatively loosely held portion of the hose that will begin to leak at a much lower pressure than the remaining portions. To remedy this objection I provide the groove 14 which is of less depth than the diameter of the cable 15, so that when the clamp is applied as shown and the cable is tightened the yoke 10 will press that portion of the cable 15 that lies in the groove 14 firmly against the hose 9 and tension will draw the remaining portions of the cable firmly in contact with the hose 9 around the remainder of its circumference, thereby forming a joint that is uniformly tight all the way around.

The end pieces 16 are shown as flattened on two sides to prevent them from being turned by the turning of the nuts 17 and to prevent twisting or untwisting of the cable 15 but it will be understood that they may be flattened on one or more sides, or may be otherwise irregularly shaped to prevent them from turning.

The cable, in wrapping around the cylindrical hose, will naturally assume a spiral formation and to prevent deflecting this cable from its normal spiral path I have offset the perforations 13 and have inclined the groove 14 slightly with respect to the longitudinal plane of the yoke 10 as hereinbefore described, it having been found that when this is done the cable will draw more freely about the hose and will tighten more easily and more uniformly.

By using two of these clamps the ends of two pieces of pipe or of two non-flexible conduits may be connected together by a piece of hose or by a flexible tube thereby forming a flexible joint, or the ends of two pieces of hose may be connected together by telescoping them over the opposite ends of a piece of pipe or non-flexible tubing and applying the clamps.

This clamp is strong, simple and cheap in construction, is easy to apply and to remove, exerts an equal pressure entirely around the circumference of the hose to which it is applied, can be fitted and removed without bending or distortion of any of the parts thereby making it extremely durable, it can be fitted and removed without disengaging the two joined parts, is readily applied to joints in inaccessible locations, may be made in any desired size, and is applicable to substantially any use to which any clamp of this nature may be put.

Obviously changes may be made in the form of construction and arrangement of parts of this device without departing from the spirit of the invention as defined by the following claims.

What I claim is:

1. A hose clamp including a yoke having a concave surface arranged to fit over a hose and having a longitudinally extending groove therein, and a flexible cable arranged to wind substantially one and one half turns about a hose and to have its ends secured to the yoke said cable being arranged to pass through said groove and the diameter of said cable being greater than the depth of said groove.

2. A hose clamp including a flexible cable arranged to be wound substantially one and one half turns around a hose, threaded end pieces on the ends of said cable and a yoke arranged transversely of the hose and having outwardly projecting end pieces provided with perforations that are offset on opposite sides of the center line of the yoke and that are arranged to receive the threaded end pieces of said cable, said yoke having a concave surface adjacent the hose that is provided with a cable receiving groove.

3. A hose clamp including a flexible binding cable arranged to be wound substantially one and one half turns around a hose, threaded terminals on the ends of said cable said terminals being flattened on one or more sides, nuts for said terminals, and a yoke disposed crosswise of the hose and having perforations in its ends that are flattened on one or more sides for the reception of said threaded cable terminals and that are offset on opposite sides of the center line of said yoke, said yoke having a concave surface that fits the hose and that has a longitudinally extending inclined groove arranged to receive said cable and to hold the same in such a position that a portion of the diameter of the cable protrudes outwardly beyond said concave yoke surface.

Seattle, Washington, October 1st, 1921.

PAUL H. WILKINSON.